Oct. 16, 1962     J. V. HALLUM     3,058,894
TREATMENT OF MICROORGANISMS
Filed Aug. 10, 1959
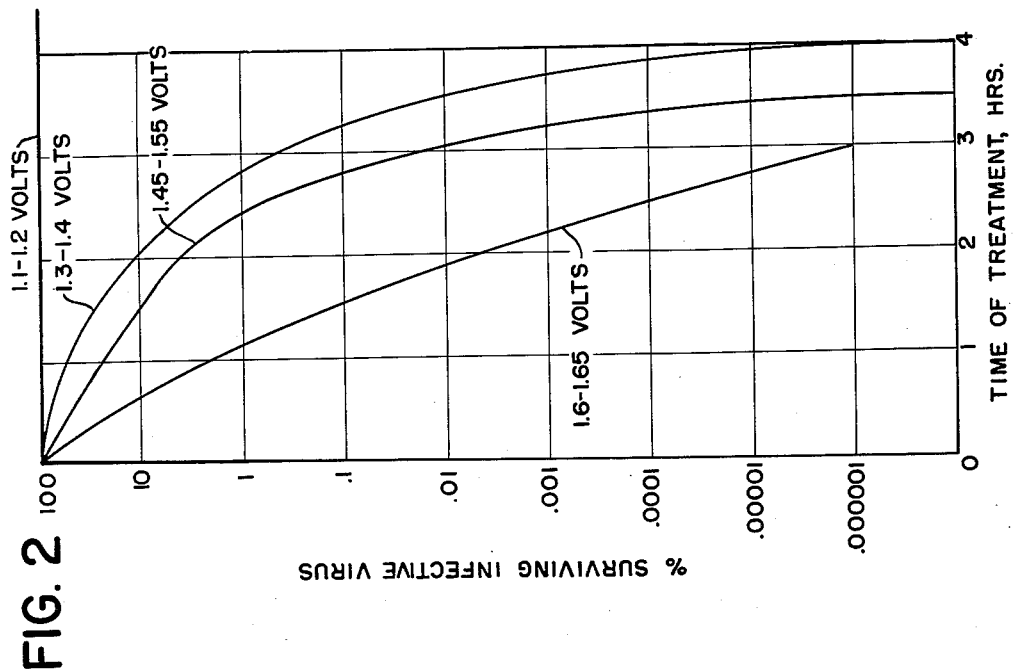
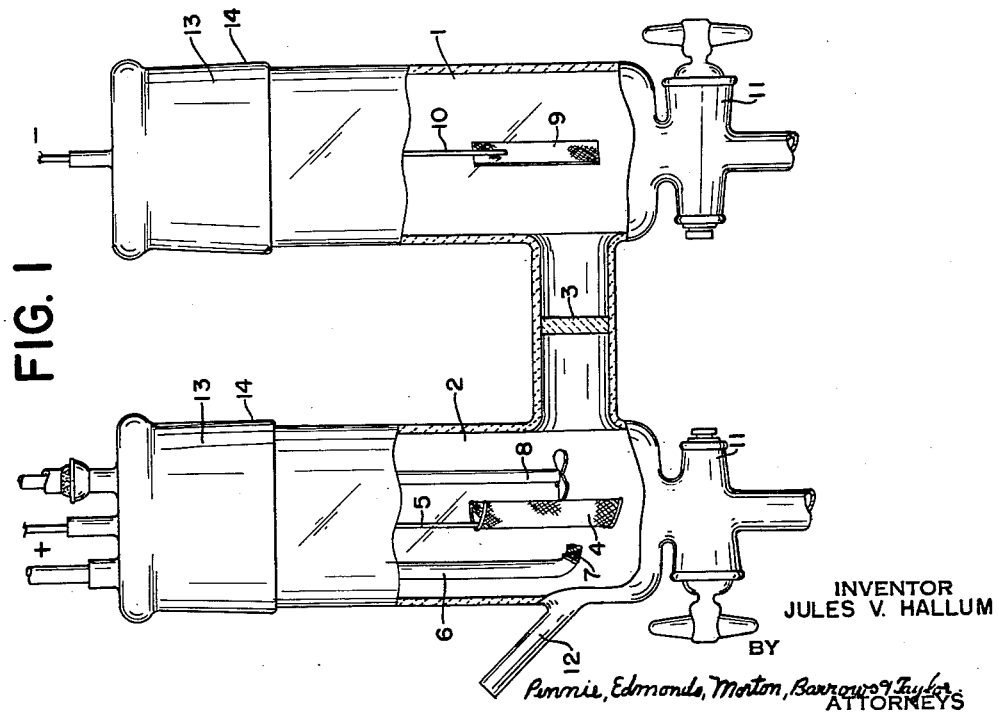
INVENTOR
JULES V. HALLUM
BY
Pennie, Edmonds, Morton, Barrows & Taylor
ATTORNEYS United States Patent Office 3,058,894
Patented Oct. 16, 1962

3,058,894
TREATMENT OF MICROORGANISMS
Jules V. Hallum, Pittsburgh, Pa., assignor to Columbian Carbon Company, New York, N.Y., a corporation of Delaware
Filed Aug. 10, 1959, Ser. No. 832,508
13 Claims. (Cl. 204—131)

This invention relates to the treatment of virulent disease-causing microorganisms, or particles, whereby such particles are modified or, in other words, inactivated, so that they are no longer capable of causing disease yet retain their immunizing, antigenic properties. More particularly, the invention relates to an improved method whereby such particles are so inactivated electrolytically.

The invention is applicable to the treating of any of the various disease-causing microorganisms or particles, including bacteria, viruses and the like. However, it has been found especially useful and effective in the treatment of viruses and, therefore, will be more particularly described and illustrated with respect thereto.

Several methods have been proposed for preparing inactivated viruses, for instance, for use as immunizing vaccines, the term vaccines being used herein in its broader sense, i.e., not restricted to vaccinia. No one method has heretofore been found effective as to all such microorganisms. The most common methods for inactivating viruses have involved chemical treatment with formaldehyde, for instance, or treatment with ultraviolet light. However, neither of those methods is entirely satisfactory.

For example, in treating polio virus with formalin, the chemical is not effective in inactivating aggregations of the viruses. Virus particles entrapped in such clusters may remain in their infective form and must, therefore, be removed from the vaccine preparation, by filtration or otherwise, before it is injected into the body to be immunized. Unfortunately, such filtration reduces the potency of the preparation, in that a loss of viruses occurs during each filtration, thus reducing the total number of immunologically active viruses in the system. Another disadvantage of the chemical method is that the reaction is very slow, usually requiring days to complete the treatment. Similar objections have been experienced in ultraviolet light treatment of disease-causing particles.

It has also been proposed to treat microorganisms by passing an electric current, at a current density of 10 to 12 amperes per 400 square centimeters, at a potential of 20 to 30 volts through the microorganisms suspended in an electrolyte, such as a solution of sodium chloride, contained in the center chamber of a three-chamber electrolytic apparatus, said center chamber being isolated from the electrode chambers by semipermeable diaphragms and each electrode chamber being filled with water. Under such conditions, the electrolyte is decomposed by electrolysis and any inactivation of the microorganisms which might be caused by the treatment appears to be effected by the chemical action of the decomposition products of the electrolysis, rather than by direct action of the electric current. The proposed method is, therefore, subject to the defects common to other chemical methods, yet is even more complicated and involved. To my knowledge, the electrical method just described has had no practical effect on the art.

Such chemical methods, in general, have of necessity involved filtration or other separation procedure with a reduction in potency, as previously noted herein, and have further been complicated by the necessity of removing or neutralizing the chemical reagent used. Unless carefully removed or neutralized, the resultant vaccine is apt to produce irritating side effects due to the residual chemicals present.

It is an object of my present invention to provide a simplified, more rapid and more economical method of inactivating disease-causing particles without destroying their immunological properties. It is a further object of the invention to provide such a method which does not involve the use of chemical reagents, thus avoiding the necessity of filtration or of removing or neutralizing residual chemicals. The invention has in its ultimate object the more efficient and more economical production of inactivated viruses, or other disease-causing particles, suitable for the preparation of vaccines and like materials.

The terms "inactivating" or "inactivated," as used herein, will be understood to mean the altering of the disease-causing particle so as to deprive it of its ability to cause the disease while retaining its ability to cause the production of specific antibodies in the animal treated therewith or, in other words, while retaining its immunological properties.

I have discovered that the above stated objects and other advantages, which will appear from the following description, may be attained by subjecting the virulent, disease-causing particle to controlled potential electrolysis, under the conditions hereinafter described. The particles so treated have been found to no longer be infective organisms yet to retain all, or nearly all, of their ability to provide immunological protection when used as vaccines. The viruses so inactivated will hereinafter sometimes be designated CPE vaccine, i.e., controlled potential electrolysis vaccine produced in accordance with my present invention.

While I do not intend to be bound to any theory as to the precise effect of my process on the disease-causing organism, there is abundant evidence to support the theory that when treated in accordance with my present process the microorganism, or some element thereof, is in some way oxidized.

The disease-causing particles, like other particles, are made up of various kinds of atoms bonded together in one way or another. One consequence of this is the existence of functional groups, either on the surface of the particle or as a part of the nucleic acid center. It is believed that these groups, or some of them, are responsible for the infectivity characteristic of the particle and that a change in their chemical nature will modify or destroy the ability of the particles to produce a disease.

It is known that controlled potential electrolysis carried on in accordance with my present invention is essentially an oxidation reaction and it appears, therefore, that the inactivation of the disease-causing particles by my present process is a result of such oxidation.

More particularly, the controlled potential electrolysis of the present invention is essentially an electrolytic oxidizing of the disease-causing particle at the anode electrode of an electrolytic cell caused by applying a constant, fixed potential across the cell. This potential must be lower than that necessary for evolution or formation of electrolytic products at the working electrode but high enough to cause the transfer of electrons between the anode and the particles being treated. It is, therefore, an essential of my present invention that there be intimate contact between the particles being treated and the anode of the cell. Such contact is promoted by stirring or otherwise agitating the liquid in the anode chamber and by maintaining the anode relatively free from coating deposits.

The electrical potential across the electrolytic cell should be of the order of about 1 to about 2 volts, versus the normal calomel electrode, i.e., below that at which either water or other inorganic matter present is decomposed. Usually this voltage should not exceed about 2 volts nor be less than about one volt, versus the normal calomel electrode. In most instances, I have usually found the most advantageous potential to fall within the range extending from about 1.2 volts to about 1.6 volts, versus the normal calomel electrode. Under these potential conditions, in conjunction with the further conditions herein described, the flow of electrical current through the cell is only that which is caused by electron transfer between the electron donor, i.e., the microorganisms, and the working electrode, i.e., the anode. This current is normally within the range of about 1 to about 10 milliamperes, more frequently within the range from about 2 to about 7 milliamperes per 10 square centimeters of working electrode area. Under such voltages, no electrolytic decomposition of the electrolyte will result.

It has been observed that the current flow will decrease if a deposit is permitted to build-up on the anode. Where a tendency toward such deposit formation is experienced, usually indicated by a reduction in current to about 2 milliamperes, the anode should be periodically removed and cleaned. This is especially important when the material being treated is contaminated by extraneous protein matter.

A further essential of my process is that the microorganism solution so treated be maintained substantially neutral, i.e., at a pH of approximately 7. Where the microorganism solution to be treated is not naturally neutral, a suitable buffering material should be mixed therewith.

A fuller understanding of the invention and the effectiveness thereof may be had from the following description and examples taken in conjunction with the accompanying drawings of which:

FIG. 1 represents conventionally and somewhat diagrammatically an electrolysis cell of the type which has been used with particular advantage in carrying out the controlled potential electrolysis of my present process, and FIG. 2 is a graph showing the relationship between electrical potential, in volts, relative to the normal calomel electrode, and duration of treatment, in hours, with respect to the effectiveness in the treatment of the Lee strain of influenza type B virus, expressed as percent surviving infective virus based on the infectivity of the original virus suspension before the treatment was begun.

As shown in FIG. 1, the electrolytic cell comprises a cathode chamber 1 and an anode chamber 2 separated by a barrier 3, composed of a fine-porosity fritted glass disc of 4–5.5 micron maximum pore size. In the anode chamber, there is provided a platinum anode 4 of semicircular form and about 10 square centimeters in working area. The anode is connected to the electric source by the conductor 5.

Also within the anode chamber, there is shown a reference electrode 6 for accurately measuring the voltage across the cell and which is provided with a dialysis membrane and retaining rings indicated at 7 or else a salt bridge connected to a normal calomel electrode, in accordance with conventional practice. In order to maintain more intimate contact between the material being treated and the working electrode 4, suitable means for agitating the suspension in the anode chamber should be provided, as previously noted. For this purpose, I have with advantage used a mechanical stirrer such as indicated at 8.

Within the cathode chamber, there is provided a platinum electrode 9 having a lead connection 10. Each of the chambers of the cell is provided with a stopcock 11 for draining or withdrawing samples and the anode chamber is provided with a side arm 12 for withdrawing samples. Further, each chamber is closed at its upper end by a cover portion 13 adapted to fit over the main body of the chamber as by means of a standard tapered ground joint indicated at 14.

The cell, except those portions otherwise indicated, is constructed of glass and is adapted to submersion in an ice bath. Any suitable means is provided for supplying direct electric current to the cell at accurately controlled, variable potentials and including means for accurately measuring voltages and amperage. Such means are well-known and need not here be described.

In operation, a measured portion of a virulent virus solution, for instance, may be diluted with an equal volume of a conventional phosphate buffer, such as prepared by dissolving equal molar portions of monosodium phosphate and disodium phosphate in an equal weight of water to form a solution buffered to a pH of approximately 7, and is placed in the anode chamber. The volume of the thus diluted and buffered virus solution should be sufficient to fill the anode chamber to a level such that the anode is at all times adequately submerged, due allowance being made for samples which may be withdrawn periodically during the operation.

To the cathode chamber, there is added a solution composed of equal volumes of the phosphate buffer solution, just described, and demineralized distilled water. No virus solution is introduced into the cathode chamber.

The electrolytic cell is adapted to be submerged in an ice bath, or otherwise maintained at 4° C., as noted above, so that the virus present in the anode cell cannot become inactivated by heat. The electric potential is then applied across the terminals of the cell, the voltage referred to the reference electrode, being controlled and regulated within the previously prescribed range.

The required duration of the treatment and the optimum potential have been found to vary considerably with different types and strains of viruses, the time factor varying somewhat with the applied voltages and also the concentration of the microorganisms in the anode chamber. The concentration of organisms in the anode chamber does not appear to be at all critical but I have found that, as the concentration is reduced, the required time for effecting inactivation of the microorganism is also reduced. While in the tests herein described, I have maintained the cell at ice bath temperatures, so as to avoid the possibility of temperature effects, the temperature of treatment is otherwise apparently of little or no importance.

As above indicated, the optimum electrical potential has been found to vary within the prescribed range with the particular microorganism being treated, other conditions being constant, and therefore it is recommended that preliminary tests be made to determine the optimum potential for the particular microorganism or virus strain being treated.

The fritted glass disc 3 is sealed into the connecting arm between the chambers and serves to prevent any migration of the virus, or other microorganism being treated, from the anode chamber to the cathode while permitting the passage of the electric current between the two chambers. In this way, any reverse reaction, e.g., any reduction, which might otherwise occur at the cathode, is prevented. In place of the fritted glass disc described, other barriers or membranes adapted to restrain the microorganisms but permit the passage of electrical current may be used.

In carrying out the tests set forth herein, I have used platinum electrodes and found them especially advantageous particularly because of the stable and nontoxic properties of platinum, thus avoiding reactions which might, of themselves, result in chemically treating the microorganisms. Platinum electrodes are also recommended in the ordinary use of the present invention. However, electrodes of any material which does not decompose under the prescribed electrolysis conditions or adversely affect the immunological activity of the microorganisms may be used.

Likewise, I have found the phosphate buffer previously described herein to be highly effective in maintaining the required pH in the anode chamber and to have no adverse effect on the immunological activity of the microorganisms treated. However, other known buffers adapted to maintain a substantially neutral pH and which do not adversely affect the immunological activity of the microorganisms may be used. The buffer may be added to the microorganism solution either as a solid or in solution. In some instances, the microorganism solution appears to contain a natural buffer, in which case no additional buffer need be added. Also, any electrolyte which is stable under the herein prescribed potential range may be used in place of the above-described buffer solution in the cathode chamber.

I have found that, as the operation proceeds, there is frequently a tendency to build up a deposit on the anode. This is evidenced by a reduction in the amount of current passing through the cell. Where this condition is encountered, the anode should be removed from the cell and cleaned. The cleaning of the anode is, with advantage, accomplished by placing the anode in hot concentrated nitric acid for approximately five minutes, then rinsing the acid from the electrode with distilled water. The electrode is then dipped into absolute ethyl alcohol and the alcohol burned off. After cooling in cold sterile distilled water, the electrode is then replaced and the electrolytic treatment continued. I have frequently found it advantageous to clean the anode in this way at intervals of about one-half hour during the operation.

For determining the optimum time of treatment for a particular microorganism, aliquot samples of the solution may be removed from the anode chamber from time to time and tested for potency and inactivation in the conventional manner. Usually the infective virus has been found to be completely inactivated in about 3–4 hours, in the case of influenza virus, while certain strains of polio virus have been found to require treatment over periods of approximately 36 to 48 hours. In contrast therewith, inactivation by treating with formalin has required 4–7 days for the influenza virus and 10–14 days for polio virus.

The invention and the effectiveness thereof will be further illustrated by the following specific examples, it being understood that the examples are for purposes of illustration and that the invention is not restricted to the embodiment thereof in these examples.

EXAMPLE I 25 milliliters of the Lee strain of influenza virus, type B, partially purified by one cycle of ultracentrifugation and resuspension, was placed in the anode chamber of an electrolysis cell, substantially as shown in FIG. 1 of the drawings, each chamber of the cell having a cubic capacity of 100 milliliters and the working surface of the platinum anode being approximately 10 square centimeters. To the anode chamber, there was also added 25 milliliters of 0.2 molar phosphate buffer solution of pH 7 prepared by adding equal molar proportions of monosodium phosphate and disodium phosphate to demineralized distilled water. To the cathode chamber there was added 25 milliliters of the same phosphate buffer solution and 25 milliliters of demineralized distilled water. All solutions, with the exception of the virus solution, were sterile. An agar salt bridge, in which the conducting electrolyte was a phosphate buffer of the same pH described above, was used to connect a normal calomel electrode with the liquid in the anode chamber of the cell, the purpose of the calomel electrode being that of accurately measuring the potential across the cell, and the calomel electrode being connected with the negative pole of the cell through a vacuum tube volt meter.

The electrolytic cell was submerged in an ice bath throughout the operation and a working electrical potential of 1.3–1.4, versus the reference electrode, was maintained throughout the experiment. At intervals of about one-half hour, the platinum anode was withdrawn from the cell and thoroughly cleaned as heretofore described.

At hourly intervals, aliquot samples of the solution were withdrawn from the anode chamber and inoculated into 10-day chicken embryos, the volume of inoculum in each instance being 0.10 milliliter per egg. The fertile eggs were allowed to incubate at 36° C. for 48 hours and were then harvested and the allantoic fluid extracted from the respective eggs was tested for the presence of viruses.

The results of these tests, in terms of 50% infective doses per milliliter of the allantoic fluid after various periods of treatment of the material are set forth in the following tabulation. For comparative purposes, the result of tests using the untreated virus is also included.

*Table 1*

| Time of treatment, hours: | 50% infective doses/ml. |
|---|---|
| 0 | $10^{7.7}$ |
| 1 | $10^{7.5}$ |
| 2 | $10^{6.7}$ |
| 3 | $10^{5.5}$ |
| 4 | 0 |
| 5 | 0 |
| 6 | 0 |
| 7 | 0 |

In addition to measuring the effect of my controlled potential electrolysis treatment on infectivity, the influence of this treatment on the ability of the influenza virus to agglutinate chicken red blood cells was determined. The ability of influenza virus to produce hemagglutination, herein designated HA, is dependent upon the integrity of the protein coat of the virus particle. In the preparation of commercial influenza vaccines currently in use, the HA activity of the preparations, after inactivation with formalin or ultraviolet radiation, is used as an indication of the residual antigenic activity which, as noted above, is dependent on the integrity of the protein coat. The results of my hemagglutination tests of the virus before treatment and after 3 and 4 hours of treatment, respectively, are set forth in the following tabulation.

*Table 2*

| Time of treatment, hours: | HA units/ml. |
|---|---|
| 0 | 1280 |
| 3 | 1280 |
| 4 | 1280 |

The results of these tests, as set forth in Table 2, indicated that there was no demonstrable loss of HA activity after four hours of my controlled potential electrolysis treatment, despite the fact that the infectivity of the virus had, by that period of treatment, been completely destroyed. These tests showed that 5 hours of treatment in accordance with my present invention had no effect upon the integrity of the protein coat of the virus particles.

The Lee strain of influenza virus used in the above test is a standard strain of influenza virus used extensively in laboratory work and is well-known to workers in this field. The methods used in testing the virus preparations were those well recognized and used by the art and described in the following publications: Standard Method of Preparing Chicken Embryo for Vaccine Production, as described by Beveridge and Burnet, Med. Res. Council, 1946, Special Report Series 256; Method of Obtaining 50% Infective Dose, based on procedure described by L. J. Reed and H. Muench, Amer. Jour. Hygiene, 1938, vol. 27, p. 493; and Hemagglutination Titer obtained by method of J. E. Salk, Jour. of Immunology, 1944, vol. 49, page 87.

The above-described tests using Lee influenza virus have been repeated 14 times with substantially the same results, as just described.

EXAMPLE II

The procedure of Example I was repeated using PR-8 strain of influenza virus (type A), the potential across the cell, referred to the calomel electrode, being 1.6–1.7 volts. Aliquot samples were withdrawn from the anode chamber at one-half hour intervals and tested for infectivity as described in Example I. The infectivity of the respective samples, expressed in terms of 50% infective doses per milliliter, are set forth in the following tabulation. The result of the test of the untreated virus is also included for comparative purposes.

Table 3

| Time of treatment, hours: | 50% infective doses per milliliter |
|---|---|
| 0 | $10^{7.2}$ |
| ½ | $10^{6.2}$ |
| 1 | $10^{6.2}$ |
| 1½ | $10^{6.2}$ |
| 2 | $10^{4.5}$ |
| 2½ | $10^{4.2}$ |
| 3 | $10^{3.5}$ |
| 3½ | $10^{1.5}$ |
| 4 | 0 |

As shown by the foregoing tabulation, the virus was completely inactivated by four hours of treatment. As in Example I, hemagglutination activity showed no change throughout the test. The operation of Example II was repeated eight times under substantially identical conditions with the same results indicated above.

EXAMPLE III

The procedure of Example I was applied to the treatment of polio virus. However, because of the prolonged period of treatment required for the activation of this particular virus, the electrolytic cell was placed in a cold room maintained at 4° C. instead of using an ice bath. In this test, the potential across the cell was maintained at 1.6–1.8 volts, as referred to the calomel electrode. The infectivity of the respective samples determined by the plaque technique in cultures of monkey kidney cells, as described by J. S. Youngner, Jour. of Immunology, 1956, vol. 76, p. 288, are set forth in the following tabulation.

Table 4

| Time of treatment, hours: | Plaque forming units per milliliter |
|---|---|
| 0 | $4.6 \times 10^7$ |
| 9 | $7.0 \times 10^6$ |
| 18 | $2.4 \times 10^3$ |
| 27 | 0.6 |
| 35 | $<0.1$ |
| 43 | $<0.1$ |

The above experiment was repeated three times with substantially the same results.

EXAMPLE IV

The procedure of the foregoing Example III was then applied to vaccinia virus, the electrical potential being 1.75–1.80 volts, versus the reference calomel electrode. The material treated initially contained approximately $10^6$ infective particles per milliliter and was rendered completely noninfective by 13 hours of treatment under the conditions noted.

The assay of the polio and vaccinia viruses of the foregoing Examples III and IV was made by the procedure described in a paper by J. S. Youngner, Journal of Immunology, 1956, vol. 76, page 288.

EXAMPLE V

Purified concentrated PR-301 influenza virus (PR-8 of Example II concentrated twenty fold) was inactivated, as described in Example II, at an electrical potential of 1.5–1.6 volts, referred to an Ag-AgI electrode. The resultant inactivated virus solution was diluted to various concentrations with physiological saline solution and 1 milliliter of the respective diluted solutions was then inoculated subcutaneously into guinea pigs, using five animals for each concentration. Five guinea pigs were also inoculated with the undiluted vaccine, for comparative purposes. As a further control, an equal number of guinea pigs were also inoculated with the vaccine resulting from inactivation of the same virus by treatment with formalin by conventional method, both undiluted and diluted to the indicated concentrations.

The respective animals were bled after two weeks and after four weeks and their blood tested for specific antibody levels by the hemagglutination-inhibition test, standard procedure. The results of the tests for specific anti- and surviving. The foregoing data show that my CPE method, i.e., my controlled potential electrolysis vaccine, and that produced by the formalin method, respectively, are set forth in the following tabulation:

Table 5

|  | Mean Antibody Titers Dilution of Vaccine | | | | |
|---|---|---|---|---|---|
|  | Undiluted | 1:4 | 1:16 | 1:64 | 1:256 |
| CPE Vaccine: |  |  |  |  |  |
| 2 wks | [1] 266 | 106 | 17 | 40 | 10 |
| 4 wks | 381 | 60 | 14 | 32 | 1 |
| Formalin Vaccine: |  |  |  |  |  |
| 2 wks | 134 | 134 | 121 | 121 | 40 |
| 4 wks | 80 | ------ | 106 | 35 | 35 |

[1] Reciprocal of the mean dilution of serum producing hemagglutination-inhibition.

The foregoing data may be summarized and supplemented by the data of the following table in which I have tabulated the ratios of the number of animals showing an antibody response to the total number of animals in each group living at the time of the bleeding:

Table 6

|  | Dilution | | | | | | | |
|---|---|---|---|---|---|---|---|---|
|  | Undiluted | | 1:4 | | 1:16 | | 1:64 | |
|  | 2 wks. | 4 wks. | 2 wks. | 4 wks. | 2 wks. | 4 wks. | 2 wks. | 4 wks. |
| CPE | 4/4 | 4/4 | 5/5 | 5/5 | 3/5 | 2/4 | 3/3 | 3/3 |
| Formalin | 4/4 | 4/4 | 4/4 | 1/1 | 5/5 | 5/5 | 5/5 | 4/5 |

In these ratios, the numerator is the number of guinea pigs showing antibody rise following vaccination and the denominator is the number of guinea pigs inoculated and surviving. The foregoing data show that my CPE vaccine is substantially equivalent to the formalin-produced vaccines in eliciting an antibody response.

EXAMPLE VI

The tests of the preceding example were repeated substantially as described except that an equal number of guinea pigs were also inoculated with the undiluted and diluted PR-301 influenza virus which had not been inactivated. The ratios of the animals showing antibody response to the total number of animals of the respective groups living at the time of the bleedings are set forth in the following tabulation:

Table 7

| | Dilution of Vaccine | | | | | | | | | |
|---|---|---|---|---|---|---|---|---|---|---|
| | Undiluted | | 1:5 | | 1:25 | | 1:125 | | 1:625 | |
| | 2 wks. | 4 wks. | 2 wks. | 4 wks. | 2 wks. | 4 wks. | 2 wks. | 4 wks. | 2 wks. | 4 wks. |
| Untreated | 3/3 | 3/3 | 4/4 | 3/3 | 3/3 | 1/1 | 4/4 | 2/2 | 2/3 | 1/1 |
| CPE Treated | 4/4 | 3/3 | 3/3 | 2/2 | 4/4 | 3/3 | 2/4 | 2/2 | 1/3 | 2/2 |
| Formalin Treated | 4/4 | 3/3 | 4/4 | 2/2 | 4/4 | 2/2 | 4/4 | 4/4 | 3/4 | 1/2 |

The above data show that my CPE vaccine is the equivalent of the untreated virus and of the formalin inactivated vaccine in its ability to cause the production of antibodies in animals.

EXAMPLE VII

To illustrate the effect of varying the electrical potential within the prescribed range in the treatment of a particular virus, I have conducted a series of further tests on the Lee strain of influenza virus and tested the resultant material by the procedure described in Example I, using in separate runs electrical potentials of 1.1–1.2 volts, 1.3–1.4 volts, 1.45–1.55 volts and 1.6–1.65 volts, respectively, referred to the calomel electrode, aliquot samples being withdrawn from the anode chamber at one-half hour intervals and tested for 50% infective doses, i.e., $ID_{50}$ per milliliter. The results of these tests, expressed as percent surviving infective virus, based on the infectivity of the original virus suspension, before subjection to my inactivation treatment, plotted against the time of treatment, in hours, at the respective potentials, are shown on the graph constituting FIG. 2 of the drawings. From this graph, it appears that the rate at which the inactivation occurs increases as the potential is increased, within the prescribed range. It further appears that at the lower voltage no appreciable inactivation of this particular virus was effected over a period of four hours.

In carrying out the process of my present invention, it is especially advantageous to use, for treatment, a virus which has been purified to the extent that it does not contain a high concentration of non-viral proteins. Though virus preparations containing high percentages of non-viral proteins may be treated successfully in accordance with my present invention, I have found that the required period of treatment of such impure virus preparations is substantially increased. For example, I have found that a concentrated, purified PR–8 influenza virus containing $10^{7.2}$ 50% infective doses per milliliter can be completely inactivated in four hours, whereas under the same conditions of treatment a concentrated impure PR–8 influenza virus containing $10^{7.5}$ 50% infective doses per milliliter is reduced only to $10^{4.5}$ in the same period of time.

Similarly, in the treatment of Lee influenza virus at a potential of 1.45–1.55 volts, versus the normal calomel electrode, I have found that, in the case of impure virus, some infective viruses were still present at the end of eight hours of treatment, whereas when the purified virus was so treated, complete inactivation was obtained in three and one-half hours. Therefore, though not essential to the successful operation of my process, it is highly desirable that the viruses so treated be as free as reasonably possible from extraneous proteins.

I claim:

1. Process for inactivating virulent disease-causing particles without destroying their immunological properties which comprises subjecting the virulent particles to electrolysis while in aqueous suspension at a pH of about 7 in contact with the anode of an electrolysis cell, at a constant potential of not less than about 1 volt versus the normal calomel electrode, but below the decomposition potential of the water-electrolyte system and while preventing contact of the said particles with the cathode of the cell.

2. The process of claim 1 in which the applied electrical potential does not exceed about 2 volts, versus the normal calomel electrode.

3. The process of claim 2 in which the electrical potential is within the range from about 1.2 to about 1.6 volts, versus the normal calomel electrode.

4. The process of claim 1 in which the fluid in the anode chamber is buffered to approximate neutrality by a phosphate buffer.

5. The process of claim 1 in which the fluid in the anode chamber is maintained in intimate contact with the anode by mechanical agitation.

6. The process of claim 1 in which the fluid in the anode chamber is substantially free from extraneous proteins.

7. The process of claim 1 in which the anode chamber and the cathode chamber are separated by a fine-porosity fritted glass disc.

8. The process of claim 1 in which the anode is of platinum.

9. The process of claim 1 in which a phosphate buffer solution is used as the electrolyte.

10. The process of claim 1 in which the disease causing particles are viruses and are mixed with a calculated amount of salts to give a solution buffered to neutral.

11. The process of claim 10 in which the virus treated is an influenza virus and is so treated at an electrical potential with the range of about 1.3 to about 1.7 volts, versus the normal calomel electrode.

12. The process of claim 10 in which the virus treated is a polio virus and is so treated at an electrical potential within the range of about 1.6 to about 1.8 volts, versus the normal calomel electrode.

13. The process of claim 10 in which the virus treated is vaccinia and is so treated at an electrical potential within the range of about 1.75 to about 1.8 volts, versus the normal calomel electrode.

References Cited in the file of this patent

UNITED STATES PATENTS

| | | |
|---|---|---|
| Re. 24,752 | Ressler | Dec. 15, 1959 |
| 1,711,416 | Lapenta | Apr. 30, 1929 |
| 1,718,282 | Fejes et al. | June 25, 1929 |
| 1,738,801 | Shemitz et al. | Dec. 10, 1929 |
| 2,428,328 | Ham et al. | Sept. 30, 1947 |

FOREIGN PATENTS

| | | |
|---|---|---|
| 150,318 | Great Britain | June 16, 1921 |

OTHER REFERENCES

"Handbuch der Virusforschung" (1938), vol. 1, Doerr et. al., pages 449–451.

UNITED STATES PATENT OFFICE
CERTIFICATE OF CORRECTION

Patent No. 3,058,894                          October 16, 1962

Jules V. Hallum

It is hereby certified that error appears in the above numbered patent requiring correction and that the said Letters Patent should read as corrected below.

Column 2, line 43, for "lik eother" read -- like other --; column 6, line 62, for "5" read -- 4 --; column 7, line 43, for "activation" read -- inactivation --; column 8, line 24, strike out "and surviving. The foregoing data show that" and insert instead -- body levels caused by the vaccine produced by --.

Signed and sealed this 2nd day of April 1963.

(SEAL)
Attest:

ESTON G. JOHNSON
Attesting Officer

DAVID L. LADD
Commissioner of Patents